United States Patent [19]

Kawashima et al.

[11] 4,201,393
[45] May 6, 1980

[54] LINKED CHAIN WITH IMPROVED SEALING RINGS

[75] Inventors: Yoshinori Kawashima, Sakado; Masaki Watanabe, Niiza; Katsuharu Kinoshita, Hanno, all of Japan

[73] Assignee: Honda Giken Kogyo Kabushiki Kaisha, Tokyo, Japan

[21] Appl. No.: 948,395

[22] Filed: Oct. 4, 1978

[30] Foreign Application Priority Data

Oct. 5, 1977 [JP] Japan ............. 52-133953[U]

[51] Int. Cl.² ................ F16J 15/34; F16J 15/32
[52] U.S. Cl. .................... 277/92; 277/206 R; 305/11
[58] Field of Search .................. 305/11–13; 277/206 R, 165, 152, 92, 95, 205, 207 R, 207 A

[56] References Cited

U.S. PATENT DOCUMENTS

| 2,420,047 | 5/1947 | Marien | 305/11 X |
| 3,390,923 | 7/1968 | Reinsma | 305/11 |
| 4,058,322 | 11/1977 | Fass | 277/206 A X |
| 4,094,515 | 6/1978 | Araya et al. | 277/92 |

FOREIGN PATENT DOCUMENTS 2244408  3/1974  Fed. Rep. of Germany ............ 305/11

*Primary Examiner*—Robert S. Ward, Jr.
*Attorney, Agent, or Firm*—Irving M. Weiner; Pamela S. Burt; Melvin Yedlin

[57] ABSTRACT

A chain having a number of link units each of which includes a pin connecting a pair of outer link plates and a bush connecting a pair of inner link plates, between which a lubricating oil is held and sealed with a sealed ring interposed between the outer and inner link plates. The sealing ring is provided at either of the inside or outside ends thereof with lips of a V or T-shaped cross-section and at the other end with a thick body of a large volume. The pin is provided with oil reservoir recesses on the outer peripheral surface spaced apart from a load point at which the pin and bush are substantially in contact with each other.

14 Claims, 10 Drawing Figures

LINKED CHAIN WITH IMPROVED SEALING RINGS

BACKGROUND OF THE INVENTION

1. Field of the Invention

The present invention relates to a chain wherein a lubricating oil is held between a pin and a bush which connects a pair of inner link plates, and is rotatably disposed on the outer periphery of the pin which connects a pair of outer link plates.

2. Description of the Prior Art

A chain is formed by continuously connecting a pair of outer link plates with a pair of inner link plates. A bush which connects the pair of inner link plates is rotatably positioned on the outer periphery of a pin which connects the pair of outer link plates so that the pin and bush may rotate relatively with each other. Thus, if the chain runs circularly between both driving and driven sprockets, the pin and bush frictionally slide with each other. There is already known a chain wherein a slight clearance between the pin and bush is filled with lubricating oil such as a grease, so as to lubricate the frictionally engaging surfaces and prevent wear. In this kind of chain, a sealing member is required to seal and hold the lubricating oil, and a ring-shaped sealing member is provided on the outer periphery of the pin between the outer and inner link plates.

A conventional sealing ring has a circular cross-sectional shape and is in elastic contact with both outer and inner link plates on both sides and with the outer peripheral surface of the pin on the inside surface. The sealing function of such sealing ring is insufficient and the sealability for the lubricating oil is questionable, because when applying the sealing ring on the outer peripheral surface of the pin, the lubricating oil already held between the pin and bush is compressed and the reaction thereof acts on and expands the ring radially outwardly. As a result, the sealing ring is expanded and deformed, permitting the lubricating oil to leak out through the inner peripheral surface of the sealing ring. Due to the imperfect sealability of the sealing ring, not only is the smooth rotation of the pin and bush questionable but also the chain is susceptible to early wear to elongation thereof, and to reduced life and durability.

There has also been considered a sealing ring of X-shaped cross-section instead of circular shaped cross-section, in order to attain a favorable sealability. However, because the applied position of the sealing ring is between the outer and inner link plates and the bush is slidable in the axial direction of the pin, it is clear that the sealing ring functions not only as a sealing member for the lubricating oil but also as a spacer for both link plates. In other words, the axial load is applied to the sealing ring due to the axial slide of the bush. Therefore, if the sealing ring is formed to be X-shaped in cross-section, it is too soft to bear the load and is not adapted for use as a spacer member.

Other problems still remain in conventional sealing rings. Even if the clearance between the pin and bush is filled with a lubricating oil as described above, the amount to be filled in the clearance is so minor that the prevention of wear of the pin and bush over a long period of time is not guaranteed. Further, the temperature of the lubricating oil rises naturally due to sliding friction between the pin and bush. It is noted that when the chain engages with the sprocket, the relative rotation of the pin and bush causes the lubricating oil to move slightly in the peripheral direction, but the relative rotational angle of the pin and bush is so small that the lubricating oil will not circulate around the pin and the oil will not be cooled.

A further important problem in this connection, is that heat is generated at a part to which a load is applied and at which the pin and bush substantially contact each other. When the chain runs with the rotation of the sprocket, a tensile force acts on each link plate and the tensile force on the inner link plate is transmitted to the bush. Therefore, the pin and bush contact each other in a part of the bush in the vicinity of which the inner plate is connected, but do not contact uniformly over the entire length of the bush, and thus contact is made locally. The contacting part is a load point. At this load point, the pin and bush directly contact each other without an intermediate oil film and therefore heat is generated locally on the bush. This heat will deteriorate the lubricating oil and will reduce the functioning of the oil. If the amount of lubricating oil to be charged is minor as described above, the influence of this heat deterioration becomes large. Particularly, even if the pin and bush rotate relatively, if the lubricating oil does not substantially flow and circulate as described above, no fresh lubricating oil will be fed to the heat generating part, i.e., the load point, the heat generating temperature will rise further and wearing at the load point will be accelerated.

The present invention provides a solution to the conventional problems described above.

SUMMARY OF THE INVENTION

An object of the present invention is to provide a chain having a sealing ring which attains an increased oil sealability and the shape of which is so determined that the sealing ring may be also used as a spacer member between the outer and inner link plates.

In order to achieve this object, the present invention provides, a lip part which is formed in a V-shaped or T-shape in cross-section on either the inside or the outside of the sealing ring, and with a thick body of a large volume on the other side. Thus, when the sealing ring is incorporated in a chain, the lip part consisting of two lips is elastically deformed by its own elastic characteristic so as to come into tight contact with both outer and inner link plates and also with the outer peripheral surface of a pin, thereby positively sealing the lubricating oil. On the other hand, if the bush slides in the axial direction of the pin, the thick body effectively supports this axial load and functions as a spacer.

Another object of the present invention is to provide a chain wherein a large amount of a lubricating oil is held between a pin and bush by providing an oil reservoir recessed on the outer periphery of the pin in a position spaced from a load point so that the lubricating oil retained in the recess may not deteriorate.

A further object of the present invention is to provide a chain wherein a lubricating oil circulates positively with the relative rotation of a pin and bush, even if the relative rotation angle is small so that the cooling of the lubricating oil and the feed of the oil to the load point may be positively made.

The present invention comprises a bottom surface of the oil reservoir recess and an outer peripheral surface of the pin which are connected through a gentle ridge at an end in the peripheral direction of the recess so that a tapered small space may be provided in the end of the recess. When the pin and bush rotate relatively, by the taper of this small space the lubricating oil in the recess is compressed and pushed off under a pressure into the clearance between the pin and bush so that the lubricating oil may circulate around the pin.

The present invention will be described in detail hereafter with reference to the drawings which illustrate preferred embodiments.

DETAILED DESCRIPTION

Figure 1:
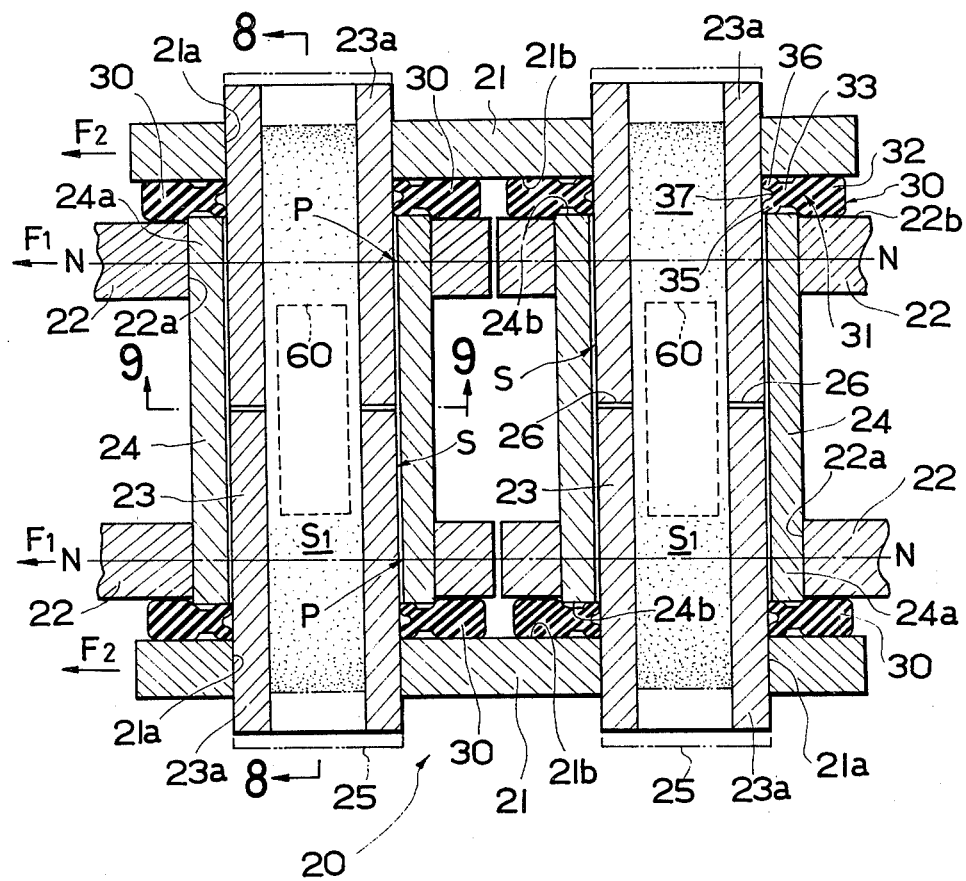
FIG. 1 is an enlarged sectioned elevational view of a chain according to the invention.
Figure 2:
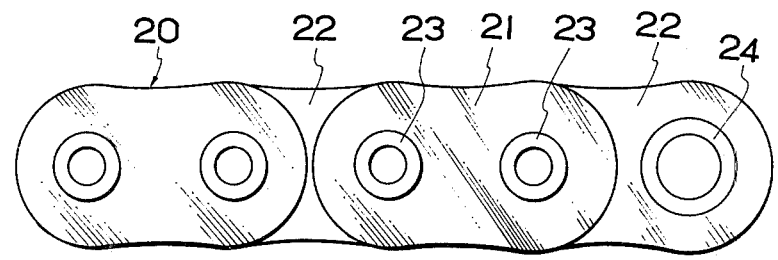
FIG. 2 is a side view of the chain.
Figure 3:
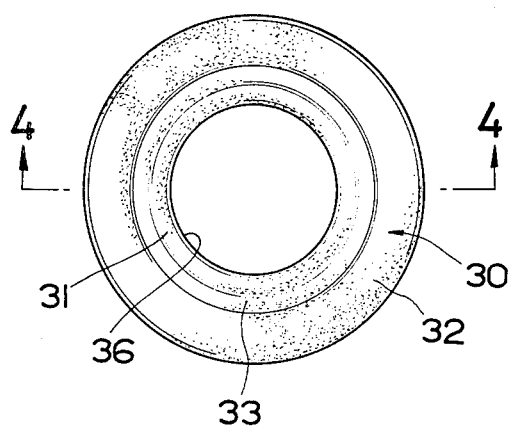
FIG. 3 is a plan view of a sealing ring shown in FIG. 1.

Referring to FIGS. 1 to 4, a chain 20 is formed by successively connecting in the lengthwise direction a pair of outer link plates 21 and a pair of inner link plates 22, each pair of which are opposed to each other. The pair of outer link plates 21 are connected with each other through a hollow pin 23 by calking the ends 23a projected out of the fitting holes 21a of the link plates 21. The pair of inner link plates 22 are connected with each other through a bush 24 by forcibly fitting the bush in the fitting holes 22a of the link plate 22 and fixing thereto so that the bush 24 is rotatably disposed on the outer periphery of the pin 23. A slight clearance S to be filled with a lubricating oil is formed between the pin 23 and bush 24.

The hollow pin 23 contains lubricating oil such as a grease in the internal chamber $S_1$ closed at the open ends with plugs 25. The pin 23 has through holes or passages 26 in the body wall thereof so that the lubricating oil in the chamber $S_1$ may be fed to the clearance S through passages 26. The amount of the lubricating oil to be fed is substantially equal to the volume of the chamber $S_1$ and is remarkably larger than the case of using a solid pin. In this embodiment, the hollow pin is used but a solid pin may also be used.

The outer link 21 and inner link plate 22 are partially opposed to each other and are spaced apart a predetermined distance so that a space for a sealing ring 30 may be formed between them. The sealing ring 30 is provided in each outer end of the pin 23 and is made of material having an elasticity and flexibility such as rubber or plastic. The ring 30 is provided with a lip part 31 at the inside end and with a thick body 32 of a comparatively large volume at the outside end. The lip part 31 and body 32 are integral with each other through a neck 33 formed by being recessed from both side surfaces 30a and 30b. The lip part 31 consists of a pair of lips 35 and 36 diagonally extending upwardly and downwardly respectively so as to be V-shaped in cross-section, thereby forming a groove 37 between the lips. The distance between the tops of the lips 35 and 36 is larger than the thickness of the body 32 and is larger than the space between the outer link plate 21 and the end surface of the bush 24 somewhat projecting out of the inner link plate 22. The inside diameter of the sealing ring 30, i.e., the tops of the lips, is smaller than the outside diameter of the pin 23 and the total length in the radial direction of the lip part 31 and neck 33 is made substantially equal to the thickness of the bush 24.

The sealing ring 30 is disposed on the outer peripheral surface of the pin 23 before the outer link plate 21 is attached to the pin 23. Because the inside diameter of the sealing ring 30 is smaller than the outside diameter of the pin 23, a pair of the lips 35 and 36 are deformed elastically and expand outwardly inverse to each other so that the lips may be pressed against and tightly contact the outer peripheral surface of the pin 23. When the outer link plate 21 is attached to the pin from the outside of the sealing ring 30, the outer side surfaces of the lips 35 and 36 come into contact with the end surface 24b of the bush and the inner surface 21b of the link plate 21 respectively and are compressed by the link plate 21 so that the degree of expansion of the lips 35 and 36 may be limited. As a result, the sealability of the lip part 31 with respect to the outer link plate 21, bush 24 and pin 23 is increased and the contact between the sealing ring and the pin are made at two points by the lips 35 and 36 so as to ensure the function of sealing the lubricating oil.

Because the clearance S between the pin 23 and bush 24 is filled with the lubricating oil before putting the sealing ring 30 on the pin 23, when the ring 30 is applied, the lubricating oil confined in the groove 37 is compressed and the reaction of the lubricating oil in the groove 37 acts outwardly in the radial direction on the sealing ring 30. However, the sealing ring 30 is provided with the thick body 32 having a sufficient strength and rigidity and therefore the ring 30 is hardly expanded or deformed in the radial direction so as to positively seal and hold the lubricating oil. With this reaction of the lubricating oil, the pair of lips 35 and 36 are pressed toward and abut against the outer link plate 21 and bush 24 so that the lubricating oil is sealed and held more positively.

The bush 24 is disposed on the pin 23 slidably in the axial direction so that during chain movement, the inner link plate 22 is likely to move toward either of the outer link plates 21 so that the load is applied to the side surface 30b of the sealing ring 30, but the strong and thick body 32 supports the load. The sealing ring 30 thus functions not only as a sealing member for the lubricating oil but also as a spacer member for both outer and inner link plates. As such, the inner link plate 22 is maintained in a predetermined position with respect to the outer link plate 21.

Figure 5:
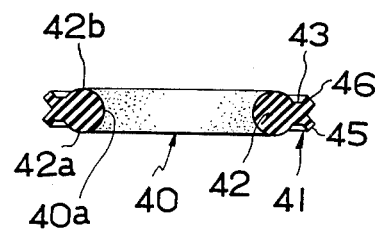
FIG. 5 is the same view as FIG. 4, showing a sealing ring of another embodiment.
Figure 4:
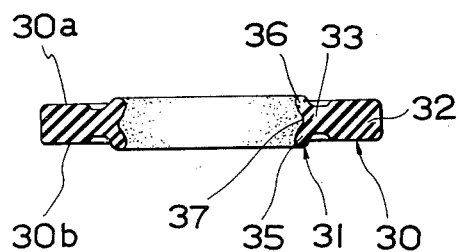
FIG. 4 is a sectioned view on line 4—4 in FIG. 3.

Turning to FIG. 5, a sealing ring 40 is provided with a lip part 41 of a V-shaped cross-section connected with a neck 43 and a thick body 42. The lip part 41 and the body 42 have reversed positions relative to each other with respect to the neck 43 so that the part 41 may be formed at the outside end and body 42 may be formed at the inside end. The body 42 is formed to be circular in cross-section and the thickness thereof is larger than the distance between the outer link plate 21 and inner link plate 22. The inside diameter of the ring 40 is smaller than the outside diameter of the bush 24. The maximum distance between the tops of lips 45 and 46 is shorter than the thickness of the body 42 but is sufficiently larger than the distance between the outer and inner link plates 21 and 22.

Figure 6:
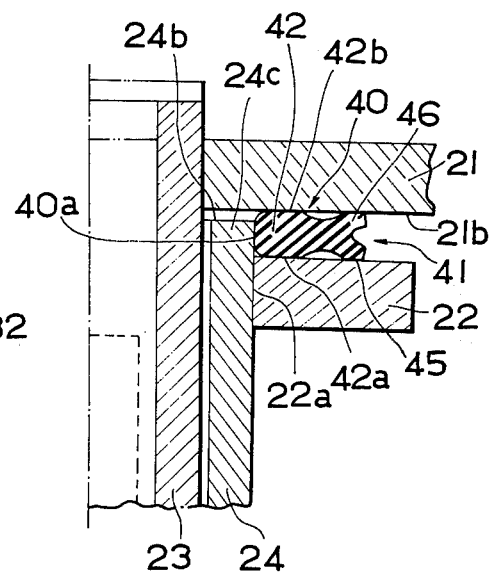
FIG. 6 is a sectioned view of a part of a chain in which the sealing ring of FIG. 5 is incorporated.

In FIG. 6, the bush 24 provided thereon with the sealing ring 40 projects out of a fitting hole 22a of the inner link plate 22 toward the inner surface 21b of the outer link plate 21 to provide an extension 24c. The ring 40 is disposed on the outer periphery of the extension 24c differently than the ring 30. Because the inside diameter of the sealing ring 40 is smaller than the outside diameter of the bush 24, the inner peripheral surface 40a is elastically deformed to come into tight contact with the outer peripheral surface of the bush 24. Further, because the thickness of the body 42 is also larger than the distance between the outer and inner link plates 21 and 22, both side surfaces 42a and 42b of the body 42 are also elastically deformed to tightly abut against the link plates 21 and 22. With the compression of the body 42 by the link plates 21 and 22, a pair of lips 45 and 46 are pressed inwardly so as to close toward each other and to tightly abut against the plates 21 and 22, thereby making double seals by the body 42 and the lips 45 and 46, to thus increase the sealing effect.

As such, in this embodiment, because the sealing ring 40 is disposed on the bush 24, the axial load by the inner link plate 22 which is connected to the bush 24 axially slidable relative to the pin 23 is supported by the large volume of the thick body 42 which functions as a spacer. If the sealing ring 40 is disposed on the pin 23 in this embodiment, the body 42 will be pressed against the rough end surface 24b of the bush 24 connected with the inner link plate 22 through a step and thus will be likely to suffer damage. However, the body 42 of this embodiment is pressed against the smooth surface of the inner link plate 22 and is hardly damaged.

Figure 7:
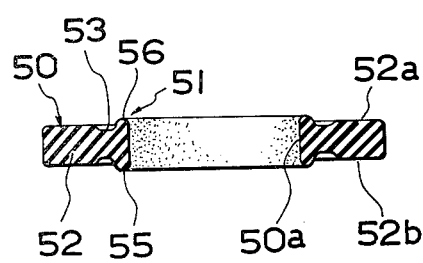
FIG. 7 is the same view as FIG. 4, showing a sealing ring of a further embodiment.
Figure 8:
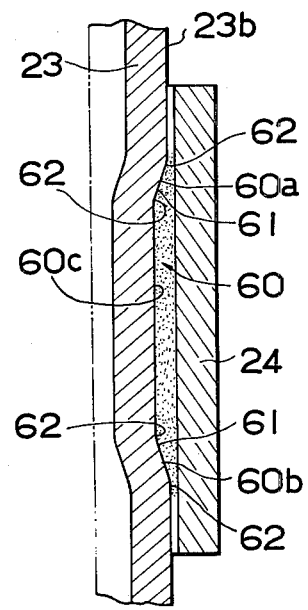
FIG. 8 is a sectioned view on line 8—8 in FIG. 1, showing a cross-sectioned view of an oil reservoir recess.
Figure 9:
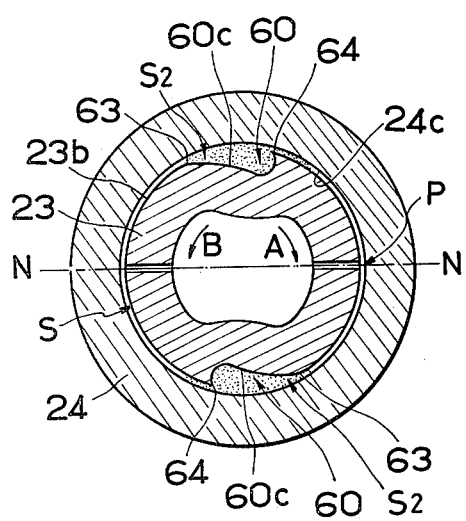
FIG. 9 is a sectioned view on line 9—9 in FIG. 1, showing a vertically sectioned view of the FIG. 8 oil reservoir recess.

Referring to FIG. 7, a sealing ring 50 has a lip part 51 which is T-shaped in cross-section and two lips 55 and 56 extending perpendicularly to the plane of the ring. A thick body 52 at the outside end and the lip part 51 at the inside end are connected through a neck 53 in the same manner as the previously described embodiments. When the ring 50 is disposed on the outer periphery of the pin 23, because its inside diameter is smaller than the outside diameter of the pin, the sealing ring 50 comes closely into contact with the peripheral surface of the pin with the flat inside surface 50a. Also, the side surfaces 52a and 52b come closely into plane-contact with the surfaces 21b and 22b of the link plates 21 and 22 or the end surface 24b of the bush 24. Further, the pair of lips 55 and 56 also come into press-contact with the outer link plate 21 and bush 24. Referring now to FIG. 8, oil reservoir recesses 60 are formed on the outer peripheral surface of the pin 23 in its middle part between the two inner link plates. When the chain 20 runs as meshed with the sprockets, tensile forces $F_1$ and $F_2$ act on the link plates 21 and 22 so that the pin 23 and bush 24 come in touch with each other at a point P on an acting line N—N of the tensile force $F_1$ and the chain driving force is transmitted from the bush 24 to the pin 23 at the point P which can be called a load point. In FIG. 9, the load point P is positioned on the right-hand side of the outer surface of the pin 23. The oil reservoir recess 60 is provided spaced apart in the axial direction of the pin 23 from this load point P, i.e., the recesses are formed on both upper and lower surfaces of the pin 23 in FIG. 9 so as to be at right angles with the running direction of the chain 20 and to be deviated by an angle of 90 degrees in the peripheral direction of the pin from the load point P. In this manner, the lubricating oil in the recess 60 can be protected from local heat generation at the load point P and heat deterioration of the oil can be prevented.

By the provision of the oil reservoir recesses 60, a larger amount of the lubricating oil can be stored and held in the clearance S between the pin 23 and bush 24, even if the pin 23 is not made hollow. The recess 60 is formed to be narrow and long in the lengthwise direction of the pin 23 and is connected in both ends 60a and 60b smoothly with the outer peripheral surface 23b of the pin 23 through slant surfaces 62 so as to maintain the strength of the pin against the bending load. The bottom surface 60c of the recess 60 is parallel with the pin in the axial direction but is inclined to the surface of the pin in the peripheral direction as clearly shown in FIG. 9. A gentle ridge 63 is formed at one end in the peripheral direction of the bottom surface 60c so that the outer peripheral surface 23b of the pin may be smoothly connected with the bottom surface 60c through the ridge 63 and a small space $S_2$ may be defined between the curved surface 63 and the inner surface 24c of the bush 24. The small space $S_2$ is gradually tapered toward the surface of the pin. The other end of the recess 60 opposite to the ridge 63 is made to rise from and overhang the recess and to intersect at an acute angle with the outer peripheral surface 23b of the pin at an edge 64.

When the link plates 21 and 22 have come the position to mesh with the sprocket, they are inclined to follow the outer periphery of the sprocket, and when the plates are disengaged from the sprocket, they return to the original state. This inclining motion is allowed by the relative movement and the coaxial angular displacement between the pin 23 and bush 24, and is repeated during the chain running. If the bush 24 is predetermined to be a stationary member, the pin 23 will rotate alternately in opposite directions A and B (FIG. 9). In case the pin 23 rotates in the direction A, the lubricating oil in the recess 60 will be moved and will flow in the direction B along the ridge 63, but will be compressed in the tapered small space $S_2$ and will be pushed off into the clearance S between the pin 23 and bush 24 under a pressure. In case the pin 23 rotates in the direction B, the lubricating oil on the inner peripheral surface of the bush will be collected into the recess 60 under the rising edge 64 the wall of which will act as a collector of the lubricating oil.

The action of pushing off the lubricating oil at the small space $S_2$ and the oil collecting action of the edge 64 are made repeatedly by alternate rotations in the directions A and B of the pin 23 so that the lubricating oil may be intermittently pushed off into the clearance S. Therefore, even if the relative rotational angle of the pin 23 and bush 24 is small to the extent of swings, the lubricating oil will circulate positively in the clearance S. Even if the temperature of the lubricating oil is raised by the sliding friction of the pin 23 and bush 24, the lubricating oil will be cooled. The function of the lubricating oil is thus maintained and prevention of the wear of the pin 23 and bush 24 is guaranteed over a long period. The circulating lubricating oil will also be fed positively to the load point P so that the friction at the load point at which the pin 23 and bush 24 slide in contact with each other may be lubricated.

Figure 10:
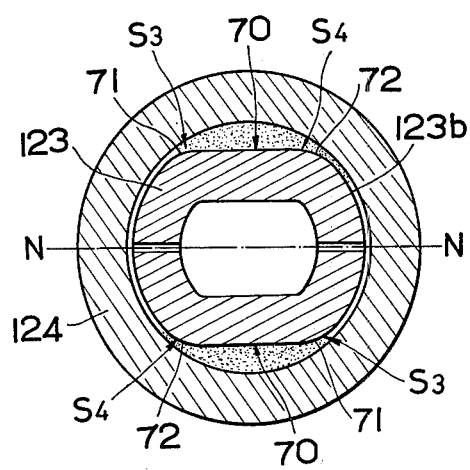
FIG. 10 is the same view as FIG. 9, showing an oil reservoir recess of another embodiment.

Each oil reservoir recess 70 shown in FIG. 10 is formed to have a flat bottom on the outer peripheral surface 123b of a pin 123. This recess 70 is connected in both end parts in the peripheral direction to the outer peripheral surface 123b of the pin through curved surfaces 71 and 72. Therefore, tapered small spaces $S_3$ and $S_4$ are provided respectively in both ends of the recess 70. Thus, even if the pin 123 rotates in either direction with respect to the bush 124, the lubricating oil will be pushed off from either small space into the clearance S between the pin 123 and bush 124 so as to attain the same action as the oil reservoir recess of the above described embodiment.

We claim:

1. A chain comprising a number of link units each of which includes a pin connecting a pair of outer link plates and a bush connecting a pair of inner link plates, between which a lubricating substance is held and sealed with a sealing ring interposed between the outer link plate and inner link plate, characterized in that said sealing ring is provided with lips at either the inside end or the outside end thereof and with a thick body at the other end thereof, and at least one oil reservoir recess is provided on the outer peripheral surface of the pin spaced apart from a load point at which said pin and bush are substantially in contact with each other.

2. A chain according to claim 1, wherein said lips are formed at the inside end of said sealing ring and said thick body is formed at the outside end thereof.

3. A chain according to claim 1, wherein said lips are formed at the outside end of said sealing ring and said thick body is formed at the inside end thereof.

4. A chain according to claim 1, wherein said lips are formed to be V-shaped in cross-section and diagonally extending sidewise of the sealing ring.

5. A chain according to claim 1, wherein said lips are formed to be T-shaped in cross-section and extending perpendicularly to the plane of the sealing ring.

6. A chain according to either one of claims 1 through 5, wherein said thick body is formed to be circular in cross-section and the thickness thereof is larger than the distance between said outer and inner link plates.

7. A chain according to claim 1, wherein the inside diameter of said sealing ring is smaller than the outside diameter of said pin and is disposed on the outer periphery of said pin.

8. A chain according to claim 1, wherein the inside diameter of said sealing ring is smaller than the outside diameter of said bush and is disposed on the outer periphery of said bush.

9. A chain according to claim 1, wherein a plurality of said oil reservoir recesses are provided spaced apart from each other in the peripheral direction of said pin.

10. A chaim according to claim 1, wherein said pin is hollow so as to contain a lubricating oil in an internal hollow chamber provided with passages communicating with both the inside and the outside of the pin to feed said lucricating oil to said clearance between the pin and bush.

11. A chain according to claim 1, wherein a tapered small space is formed between at least one end in the peripheral direction of the pin, of said oil reservoir recess and the inside surface of said bush.

12. A chain according to claim 11, wherein said end of said oil reservoir recess is formed with a curved surface.

13. A chain according to claim 11, wherein said curved surface is provided at only one end in the peripheral direction of the pin, of said oil reservoir recess and an edge intersecting at an acute angle with the outer peripheral surface of said pin is provided at the other end.

14. A chain according to claim 11, wherein said curved surface is provided at each end in the peripheral direction of the pin, of said oil reservoir recess.

* * * * *